(12) United States Patent
Onoda

(10) Patent No.: US 10,688,342 B2
(45) Date of Patent: Jun. 23, 2020

(54) JUDGMENT-ASSISTANCE PROCESSING DEVICE, JUDGMENT ASSISTANCE SYSTEM, JUDGMENT ASSISTANCE METHOD, AND MEDIUM RECORDING THEREIN JUDGMENT ASSISTANCE PROGRAM

(71) Applicant: JVC KENWOOD Corporation, Yokohama-shi, Kanagawa (JP)

(72) Inventor: Hideaki Onoda, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 220 days.

(21) Appl. No.: 15/885,954

(22) Filed: Feb. 1, 2018

(65) Prior Publication Data

US 2018/0236304 A1 Aug. 23, 2018

(30) Foreign Application Priority Data

Feb. 23, 2017 (JP) ................................ 2017-032094

(51) Int. Cl.
*G06K 9/00* (2006.01)
*A63F 13/00* (2014.01)
(Continued)

(52) U.S. Cl.
CPC ...... *A63B 24/0021* (2013.01); *G06K 9/00751* (2013.01); *G06T 7/246* (2017.01);
(Continued)

(58) Field of Classification Search
USPC ........ 382/100, 103, 106–107, 122–123, 168, 382/173, 181, 190, 199, 216, 232, 254,
(Continued)

(56) References Cited

U.S. PATENT DOCUMENTS

2014/0315610 A1* 10/2014 Shachar ................. G06T 7/292
463/7
2016/0151696 A1* 6/2016 Chen ................. A63B 69/3614
473/199
(Continued)

OTHER PUBLICATIONS

Announcement of New Tournament Systems and Game Schedules for the 50th Anniversary of Establishment of the Volleyball National League, 2016/17 V-Premier League, Japan Volleyball Association, Jun. 29, 2016, URL: https://www.jva.or.jp/index.php/topics/20160629-2.

*Primary Examiner* — Seyed H Azarian
(74) *Attorney, Agent, or Firm* — Amin, Turocy & Watson, LLP

(57) ABSTRACT

A judgment-assistance processing device includes a frame-display control unit that causes frames of lines on a court for a ball sport to be displayed on a display unit; a movement-information extracting unit that detects a ball from the frames displayed on the display unit and extracts movement information that indicates the moving velocity and the moving direction of the ball; an upon-reversal information extracting unit that detects whether the moving direction of the ball is reversed in the first direction and extracts at least the magnitude of the component of the moving velocity of the ball upon reversal; a frame selecting unit that selects the one or more frames from the frames in accordance with the magnitude of the component of the moving velocity of the ball upon reversal; and a highlighted-display control unit that highlights the one or more frames that are selected from the frames.

7 Claims, 11 Drawing Sheets

(51) Int. Cl.
　　　*A63B 24/00*　　　(2006.01)
　　　*G06T 7/292*　　　(2017.01)
　　　*G06T 7/246*　　　(2017.01)
　　　*G06T 7/73*　　　(2017.01)

(52) U.S. Cl.
　　　CPC ............... *G06T 7/292* (2017.01); *G06T 7/73* (2017.01); *A63B 2220/05* (2013.01); *G06T 2207/10016* (2013.01); *G06T 2207/30224* (2013.01); *G06T 2207/30241* (2013.01)

(58) Field of Classification Search
　　　USPC ..... 382/276, 286–291, 305, 318; 1/1; 463/7, 463/2; 473/199
　　　See application file for complete search history.

(56) References Cited

U.S. PATENT DOCUMENTS

| | | | |
|---|---|---|---|
| 2017/0083769 A1* | 3/2017 | Van Rensburg | H04N 5/77 |
| 2017/0213087 A1* | 7/2017 | Chen | G06T 7/248 |
| 2018/0154232 A1* | 6/2018 | Gentil | G06T 7/254 |

* cited by examiner

| VECTOR | TIME | X DIRECTION | Y DIRECTION | REVERSAL |
|---|---|---|---|---|
| ⋮ | ⋮ | ⋮ | ⋮ | ⋮ |
| A1 | t1 | $-X_{A1}$ | $-Y_{A1}$ | - |
| A2 | t2 | $-X_{A2}$ | $+Y_{A2}$ | ○ |
| A3 | t3 | $-X_{A3}$ | $+Y_{A3}$ | - |
| ⋮ | ⋮ | ⋮ | ⋮ | ⋮ |

FIG.8

| 62a | 62b | 62c | 62d | 62f | 62g |
|---|---|---|---|---|---|
| VECTOR | TIME | X DIRECTION | Y DIRECTION | FRAME | RANK OF MAGNITUDE IN X DIRECTION |
| A2 | t2 | $-X_{A2}$ | $+Y_{A2}$ | FRAME 77 | 1 |
| B2 | t2 | $+X_{B2}$ | $+Y_{B2}$ | FRAME 74 | 2 |
| C2 | t2 | $+X_{C2}$ | $+Y_{C2}$ | FRAME 76 | 3 |

DT2

JUDGMENT-ASSISTANCE PROCESSING DEVICE, JUDGMENT ASSISTANCE SYSTEM, JUDGMENT ASSISTANCE METHOD, AND MEDIUM RECORDING THEREIN JUDGMENT ASSISTANCE PROGRAM

CROSS-REFERENCE TO RELATED APPLICATION(S)

The present application claims priority to and incorporates by reference the entire contents of Japanese Patent Application No. 2017-032094 filed in Japan on Feb. 23, 2017.

FIELD

The present disclosure relates to a judgment-assistance processing device, a judgment assistance system, a judgment assistance method, and a medium recording therein a judgment assistance program.

BACKGROUND

During a ball sport, such as volleyball or tennis, a frame in which the court is captured is sometimes used when a judgment (hereafter, referred to as "in-out judgment") is made as to whether the point of fall of the ball is inside (in) or outside (out) of the court (for example, see "Announcement of new tournament systems and game schedules for the 50th anniversary of establishment of the volleyball national league, 2016/17 V•Premier League", Jun. 29, 2016, Japan volleyball Association, searched on Feb. 8, 2017, the Internet <URL:https://www.jva.or.jp/index.php/topics/20160629-2>). For example, the side line and the end line on the court are captured by cameras at different angles, and the frames are displayed side by side on the display unit. Judges, or the like, make in-out judgments by checking the frames displayed on the display unit.

When in-out judgments are made using the above-described technique, judges, or the like, need time to find out the frame to be used for a judgment from multiple frames as the frames are displayed alongside on the display unit. For this reason, there is a possibility that there is an increase in the time required for in-out judgments.

The present disclosure has been made in view of the foregoing, and an object of the present disclosure is to provide a judgment-assistance processing device, a judgment assistance system, a judgment assistance method, and a medium recording therein a judgment assistance program, by which it is possible to reduce the time required for in-out judgments.

SUMMARY

A judgment-assistance processing device according to the present disclosure includes a frame-display control unit that causes frames of lines on a court for a ball sport to be displayed side by side on a display unit, the frames being captured by multiple cameras at different angles, a movement-information extracting unit that detects a ball from the frames displayed on the display unit and extracts movement information that indicates a moving velocity and a moving direction of the ball within the frame, an upon-reversal information extracting unit that detects whether the moving direction of the ball is reversed in a first direction within the frame and extracts at least a magnitude of a component of the moving velocity of the ball upon reversal in a second direction, the second direction being perpendicular to the first direction, a frame selecting unit that selects the one or more frames from the frames displayed on the display unit in accordance with the magnitude of the component of the moving velocity of the ball upon the reversal in the second direction, and a highlighted-display control unit that highlights the one or more frames that are selected from the frames displayed on the display unit.

A judgment assistance system according to the present disclosure includes multiple cameras that capture lines on a court for a ball sport at different angles, a display unit that may display frames that are captured by the cameras, and the judgment-assistance processing device described above, performing a judgment assistance process when a judgment is made as to whether a point of fall of a ball is inside or outside of the court based on the frames displayed on the display unit.

A judgment assistance method according to the present disclosure includes causing frames of lines on a court for a ball sport to be displayed side by side on a display unit, the frames being captured by multiple cameras at different angles, detecting a ball from the frames displayed on the display unit and extracting movement information that indicates a moving velocity and a moving direction of the ball within the frame, detecting whether the moving direction of the ball is reversed in a first direction within the frame and extracting at least a magnitude of a component of the moving velocity of the ball upon reversal in a second direction, the second direction being perpendicular to the first direction, selecting the one or more frames from the frames displayed on the display unit in accordance with the magnitude of the component of the moving velocity of the ball upon the reversal in the second direction, and highlighting the one or more frames that are selected from the frames displayed on the display unit.

A non-transitory computer readable recording medium recording therein a judgment assistance program according to the present disclosure causes a computer to execute a process to cause frames of lines on a court for a ball sport to be displayed side by side on a display unit, the frames being captured by multiple cameras at different angles, a process to detect a ball from the frames displayed on the display unit and extract movement information that indicates a moving velocity and a moving direction of the ball within the frame, a process to detect whether the moving direction of the ball is reversed in a first direction within the frame and extract at least a magnitude of a component of the moving velocity of the ball upon reversal in a second direction, the second direction being perpendicular to the first direction, a process to select the one or more frames from the frames displayed on the display unit in accordance with the magnitude of the component of the moving velocity of the ball upon the reversal in the second direction, and a process to highlight the one or more frames that are selected from the frames displayed on the display unit.

BRIEF DESCRIPTION OF THE DRAWINGS

FIG. 8 is the data table that indicates the movement information on each extracted reverse velocity vector;

DETAILED DESCRIPTION

With reference to the drawings, an explanation is given below of embodiments of a judgment-assistance processing device, a judgment assistance system, a judgment assistance method, and a medium recording therein a judgment assistance program according to the present disclosure. Furthermore, the present disclosure is not limited to some embodiments. Moreover, the components in the following embodiments include the ones that are straightforward and replaceable by a person skilled in the art or that are substantially the same.

First Embodiment

Figure 1:
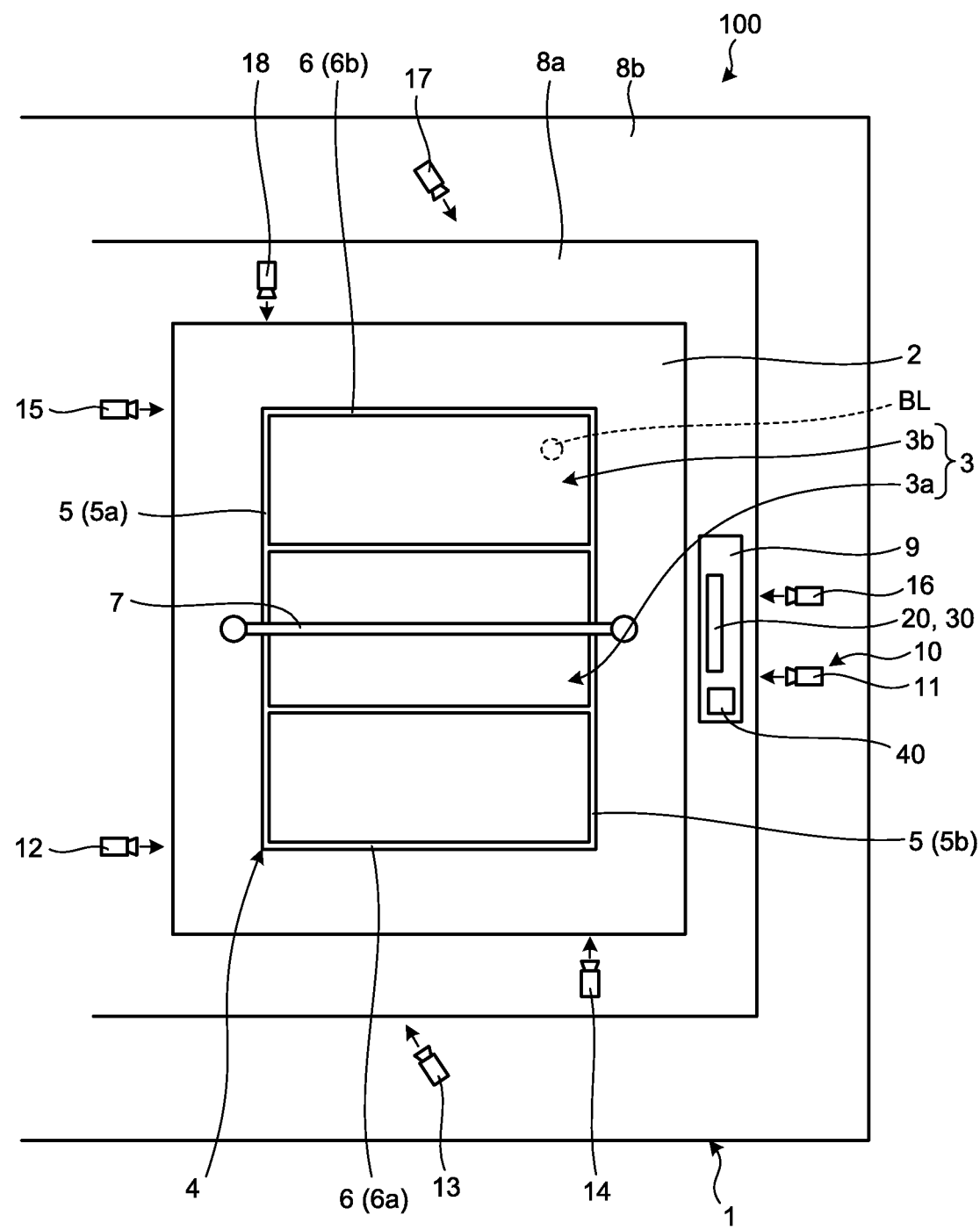
FIG. 1 is a diagram that illustrates an example of a judgment assistance system according to a first embodiment.

FIG. 1 is a diagram that illustrates an example of a judgment assistance system 100 according to a first embodiment. The judgment assistance system 100 is used when an in-out judgment is conducted as to whether the point of fall of a ball (including a shuttlecock) BL, which drops on a floor section 2, is inside (in) or outside (out) of a court 3 during a ball sport, such as volleyball, tennis, or badminton. According to one embodiment, an explanation is given using volleyball as an example of the ball sport; however, this is not a limitation.

The judgment assistance system 100 is provided on a game site 1 where the ball sport takes place. In the game site 1, for example, the court 3 is provided on the floor section 2. The court 3 is sectioned with lines 4. The lines 4 include a side line 5 and an end line 6. A net 7 is provided in the center of the court 3. On the court 3, a first zone 3a and a second zone 3b are specified with the net 7 interposed therebetween. According to one embodiment, the first zone 3a is the zone at the lower side of the net 7 in the figure, and the second zone 3b is the zone at the upper side of the net 7 in the figure. A lower deck 8a and an upper deck 8b are provided around the court 3. A judge's seat 9 is provided in the lower deck 8a on the side of the net 7. Furthermore, the formation of the game site 1 is not limited to the above.

Figure 2:
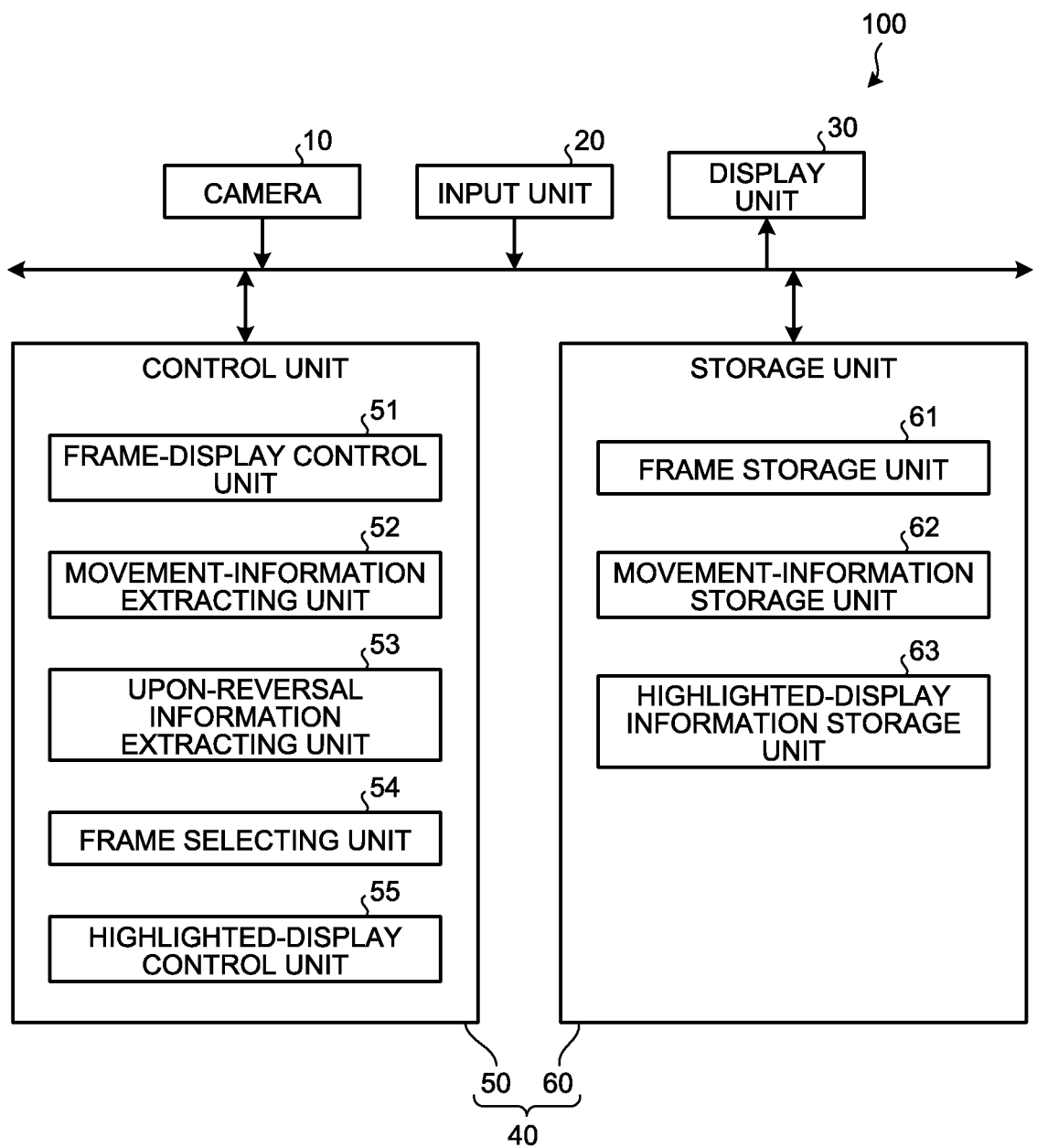
FIG. 2 is a functional block diagram that illustrates an example of the judgment assistance system.

FIG. 2 is a functional block diagram that illustrates an example of the judgment assistance system 100. As illustrated in FIGS. 1 and 2, the judgment assistance system 100 includes a camera 10, an input unit 20, a display unit 30, and a judgment-assistance processing device 40.

The number of the cameras 10 provided are multiple, for example, eight. Hereafter, if the eight cameras 10 are explained without being distinguished, they are referred to as the cameras 10 in the explanation, and if the eight cameras 10 are distinctively explained, they are attached with different reference numerals, i.e., cameras 11 to 18, in the explanation. Furthermore, the number of the cameras 10 is not limited to eight. For example, it is appropriate if the number of the cameras 10 is at least more than two to capture the same end line 6 or the same side line 5.

The camera 11 is provided for example in the upper deck 8b on the side (the right side of FIG. 1) of the judge's seat 9 with respect to the court 3. The camera 11 captures for example the entire first zone 3a. The camera 12 is provided for example in the lower deck 8a at the opposite side (the left side of FIG. 1) of the judge's seat 9 with respect to the court 3. The camera 12 captures for example an entire end line 6a of the first zone 3a.

The camera 13 is provided for example in the upper deck 8b at the side of the first zone 3a. The camera 13 captures an entire side line 5a on one side (e.g., the side line 5 on the left side of FIG. 1) from outside the first zone 3a. The camera 14 is provided for example in the lower deck 8a at the side of the first zone 3a. The camera 14 captures an entire side line 5b on the other side (e.g., the side line 5 on the right side of FIG. 1) from outside the first zone 3a.

Furthermore, the camera 15 is provided for example in the lower deck 8a at the opposite side of the judge's seat 9 with the court 3 interposed therebetween. The camera 15 captures for example an entire end line 6b of the second zone 3b. The camera 16 is provided in the upper deck 8b on the side of the judge's seat 9 with respect to the court 3. The camera 16 captures for example the entire second zone 3b.

The camera 17 is provided for example in the upper deck 8b at the side of the second zone 3b. The camera 17 captures the entire side line 5b from outside the second zone 3b. The camera 18 is provided for example in the lower deck 8a at the side of the second zone 3b. The camera 18 captures the entire side line 5a from outside the second zone 3b.

Among the above-described cameras 11 to 18, the angle of view, zoom, and the like, are set to be substantially the same for the cameras 13, 14, 17, and 18 that capture the side line 5 (5a, 5b). Furthermore, the angle of view, zoom, and the like, are set to be substantially the same for the cameras 12 and 15 that capture the end line 6 (6a, 6b). Furthermore, a configuration may be such that the camera 11, which captures the entire first zone 3a, and the camera 16, which captures the entire second zone 3b, are provided on for example the ceiling of the game site 1 and capture it from above.

The input unit 20 enables predetermined input operations for inputting information. As the input unit 20, an input device, such as a touch panel, is used. In this case, the input unit 20 is provided by being integrated with the display unit 30 that is described later. Furthermore, in addition to the touch panel or instead of the touch panel, a button, lever, dial, switch, or other input devices may be used as the input unit 20. The input unit 20 outputs command signals that correspond to the predetermined input operations.

The display unit 30 includes a display panel, such as a liquid crystal panel. The display unit 30 displays various types of information that include characters and images. The display unit 30 may display, for example, frames captured by each of the cameras 10 or an input-operation image for conducting touch operations with the input unit 20. Furthermore, when a touch operation is performed on the area that corresponds to the input-operation image, displayed on the display unit 30, on the surface of the touch panel, the above-described input unit 20 outputs a predetermined command signal that includes the positional information on the area where the touch operation has been performed.

The judgment-assistance processing device 40 causes the display unit 30 to display frames captured by the cameras 10 and performs a judgment assistance process when the judge, or the like, makes in-out judgment. During the judgment assistance process, the judgment-assistance processing device 40 selects a frame, which is effective for an in-out judgment, from the frames displayed on the display unit 30 and highlights the selected image. Furthermore, frames that are effective for in-out judgments include, for example, frames that capture the point of fall of the ball BL in a situation where the ball BL drops on a floor section FL. As illustrated in FIG. 2, the judgment-assistance processing device 40 includes a control unit 50 and a storage unit 60.

The control unit 50 performs control on each unit, i.e., the cameras 10, the input unit 20, and the display unit 30. The control unit 50 includes a processing device, such as a central processing unit (CPU), and a storage device, such as a random access memory (RAM) or a read only memory (ROM). The control unit 50 includes a frame-display control unit 51, a movement-information extracting unit 52, an upon-reversal information extracting unit 53, a frame selecting unit 54, and a highlighted-display control unit 55.

The frame-display control unit 51 receives the frame information captured by the cameras 10. The frame-display control unit 51 outputs the received frame information to the display unit 30 and causes the display unit 30 to display them as frames side by side. Furthermore, the frame-display control unit 51 stores the received frame in the storage unit 60. In this case, the frame-display control unit 51 stores each frame in relation to time information, such as a capturing time, in the storage unit 60.

Figure 3:
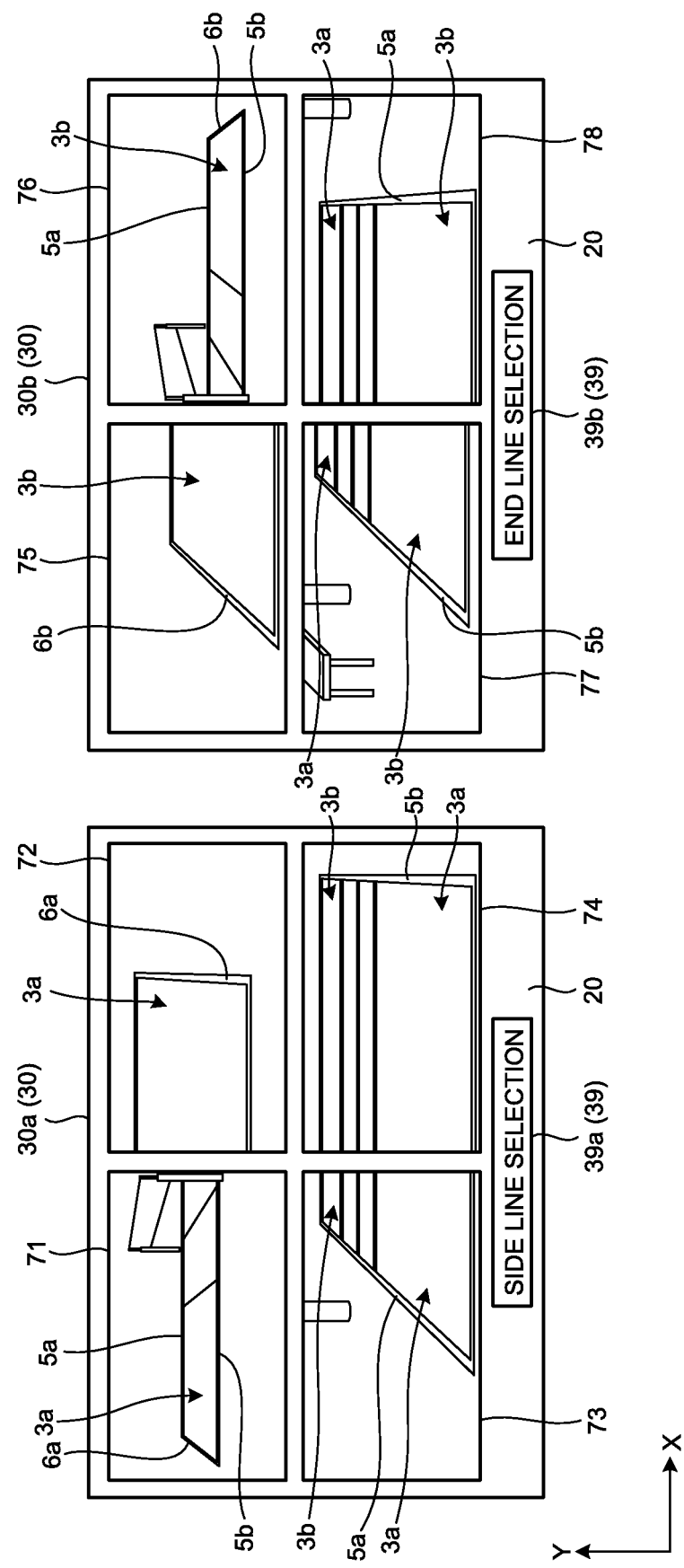
FIG. 3 is a diagram that illustrates examples of the frame displayed on the display unit.

FIG. 3 is a diagram that illustrates examples of the frame displayed on the display unit 30. As illustrated in FIG. 3, according to the present disclosure, the display unit 30 includes a first display section 30a and a second display section 30b. The frame-display control unit 51 causes the first display section 30a and the second display section 30b to display eight frames 70, captured by the eight cameras 10, side by side. Hereafter, if the eight frames 70 are explained without being distinguished, they are referred to as the frames 70 in the explanation, and if the eight frames 70 are distinctively explained, they are attached with different reference numerals, i.e., the frames 71 to 78, in the explanation.

The frame-display control unit 51 causes the first display section 30a to display the frames 71 to 74 side by side. The frame 71 is a frame captured by the camera 11, and it is a frame of the entire first zone 3a. The frame 72 is a frame captured by the camera 12, and it is a frame of the entire end line 6a in the first zone 3a. The frame 73 is a frame captured by the camera 13, and it is a frame of the side line 5a, captured from the side of the first zone 3a. The frame 74 is a frame captured by the camera 14, and it is a frame of the side line 5b, captured from outside the first zone 3a. In this way, the frame-display control unit 51 causes the first display section 30a to display the frames captured by the cameras 11 to 14 at the side of the first zone 3a of the court 3.

Conversely, the frame-display control unit 51 causes the second display section 30b to display the frames 75 to 78 side by side. The frame 75 is a frame captured by the camera 15, and it is a frame of the end line 6b in the second zone 3b. The frame 76 is a frame captured by the camera 16, and it is a frame of the entire second zone 3b. The frame 77 is a frame captured by the camera 17, and it is a frame of the side line 5b, captured from outside the second zone 3b. The frame 78 is a frame captured by the camera 18, and it is a frame of the side line 5a, captured from outside the second zone 3b. In this way, the frame-display control unit 51 causes the second display section 30b to display the frames captured by the cameras 15 to 18 at the side of the second zone 3b of the court 3.

For example, each of the frames 70 is rectangular with the same dimension. The Y direction (first direction) and the X direction (second direction), which are perpendicular to each other, are set for each of the frames 70. The Y direction is, for example, a vertical direction in the field of view of each of the cameras 10, and it is a vertical direction (up-and-down direction in FIG. 3) of each of the frames 70. The X direction is, for example, a horizontal direction in the field of view of each of the cameras 10, and it is a horizontal direction (right-and-left direction in FIG. 3) of each of the frames 70.

According to the present disclosure, a positive direction along the Y direction is an upward direction along the vertical direction in the field of view of the camera 10, and its negative direction is a downward direction. Furthermore, according to the present disclosure, a positive direction along the X direction is a rightward direction along the horizontal direction in the field of view of the camera 10, and its negative direction is a leftward direction.

The number of the display units 30 may be one or three or more. If there is the single display unit 30, the frame-display control unit 51 causes the single display unit 30 to display the frames 70 side by side. Furthermore, if there are the three or more display units 30, the frame-display control unit 51 may cause the one or more display units 30 to display the frames 70 side by side.

Furthermore, in addition to the above-described frames 70, the display unit 30 displays, for example, an operation button, such as a selection button 39. The selection button 39 is a button for selecting one judgment target line, which is targeted for the in-out judgment, from the side line 5 and the end line 6. The selection button 39 includes a side-line selection button 39a for selecting the side line 5 and an end-line selection button 39b for selecting the end line 6.

The side-line selection button 39a is displayed on for example the first display section 30a. The end-line selection button 39b is displayed on for example the second display section 30b. Furthermore, the side-line selection button 39a and the end-line selection button 39b may be displayed on any one of the first display section 30a and the second display section 30b.

If an operator, or the like, touches the area where the side-line selection button 39a is displayed on the screen of the display unit 30, the input unit 20 outputs the signal indicating that the side line 5 is selected as a judgment target line to the control unit 50. If an operator, or the like, touches the area where the end-line selection button 39b is displayed on the screen of the display unit 30, the input unit 20 outputs the signal indicating that the end line 6 is selected as a judgment target line to the control unit 50.

The movement-information extracting unit 52 detects a ball BL1 (hereafter, the reference numeral of the ball on the frame 70 is BL1) within the frames 70 displayed on the display unit 30 and extracts the movement information on the ball BL1 within the frame 70 where the ball BL1 is detected. The movement information indicates the moving velocity and the moving direction of the ball BL1. The movement-information extracting unit 52 stores the extracted movement information in the storage unit 60.

The upon-reversal information extracting unit 53 detects whether the moving direction of the ball BL1 within the frame 70 is reversed in the Y direction and extracts at least the magnitude of the X component of the moving velocity of the ball BL1 within the frame 70 upon reversal. For example, if the ball BL drops and rebounds on the floor section 2 in the game site 1, the value of the Y component of the ball BL1 in the moving direction is reversed from negative to positive on the frame 70 captured by the camera 10. Therefore, the upon-reversal information extracting unit 53 extracts the magnitude of the X component of the moving velocity of the ball BL1 within the frame 70 at the point of fall where the ball BL drops on the floor section 2. The upon-reversal information extracting unit 53 stores the extracted upon-reversal information in the storage unit 60.

The frame selecting unit 54 selects the one or more frames 70 from the frames 70 displayed on the display unit 30 on the basis of the magnitude of the X component of the moving velocity of the ball BL1 within the frame 70 upon reversal. For example, if one judgment target line is selected from the side line 5 and the end line 6, the frame selecting unit 54 selects the frame 70 that has the largest value of the X component of the moving velocity of the ball BL1 upon reversal and the frame 70 that has the second largest value from the frames 70 in which the judgment target line is captured.

The highlighted-display control unit 55 highlights one or more frames that are selected by the frame selecting unit 54 from the frames displayed on the display unit 30.

The storage unit 60 includes storage, such as a hard disk drive or a solid state drive. Furthermore, an external storage medium, such as a removable disk, may be used as the storage unit 60. The storage unit 60 stores the operating system for the judgment assistance process, various programs for controlling operations of the camera 10, the input unit 20, and the display unit 30, various types of programs and data for performing processes in the judgment-assistance processing device 40, or the like.

Furthermore, the storage unit 60 stores the judgment assistance program by which the judgment-assistance processing device 40 performs the process to cause the frames 70 of the lines 4 on the court 3 for a ball sport, captured by the cameras 10 from different angles, to be displayed side by side on the display unit 30; the process to detect the ball BL1 within the frames 70 displayed on the display unit 30 and extract the movement information that indicates the moving velocity and the moving direction of the ball BL1 within the frame 70; the process to detect whether the moving direction of the ball BL1 is reversed in the Y direction within the frame 70 and extract at least the magnitude of the X component of the moving velocity of the ball BL1 upon reversal; the process to select the one or more frames 70 from the frames 70 displayed on the display unit 30 on the basis of the magnitude of the X component of the moving velocity of the ball BL1 upon reversal; and the process to highlight the one or more frames 70 that are selected from the frames 70 displayed on the display unit 30. Furthermore, in addition to the above-described judgment assistance program, the storage unit 60 stores for example the programs for causing the judgment-assistance processing device 40 to perform the process to display the selection button 39, the image processing to detect the ball BL1, or the like.

Furthermore, the storage unit 60 includes a frame storage unit 61, a movement-information storage unit 62, and a highlighted-display information storage unit 63.

The frame storage unit 61 receives frame information that is output from the frame-display control unit 51. The frame storage unit 61 stores received frame information. For example, the frame storage unit 61 stores frame information in relation to time information.

The movement-information storage unit 62 receives the movement information that is extracted by the movement-information extracting unit 52. The movement-information storage unit 62 stores received movement information.

The highlighted-display information storage unit 63 stores display data, display programs, and the like, for highlights that are presented on the display unit 30.

Figure 4:
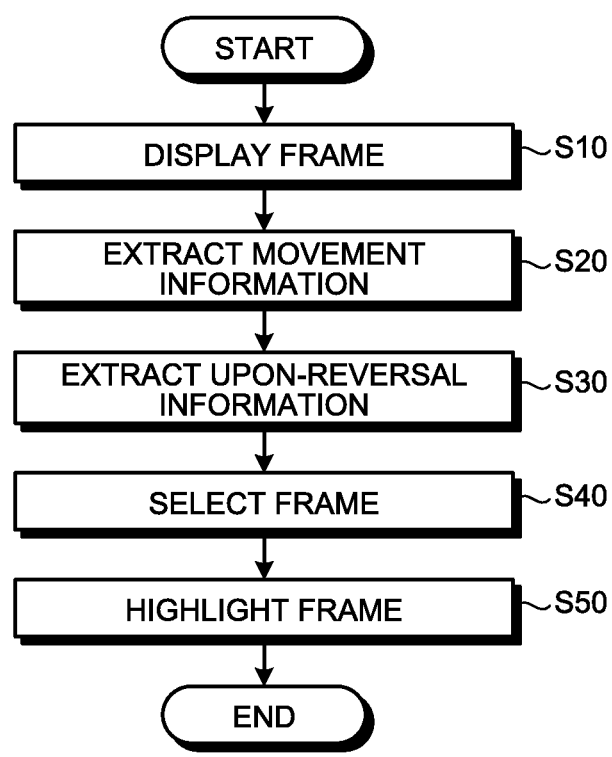
FIG. 4 is a flowchart that illustrates an example of the operation of the judgment assistance system according to one embodiment.
Figure 5:
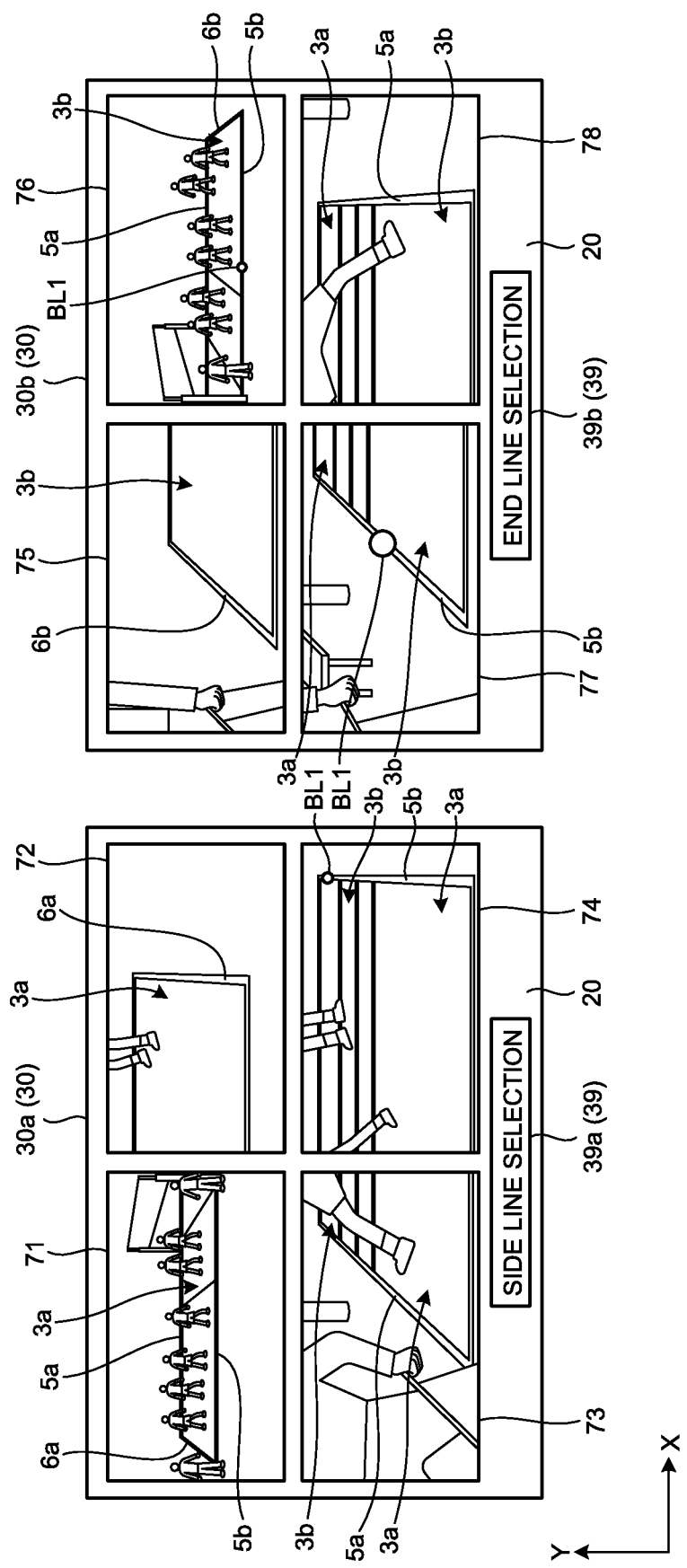
FIG. 5 is a diagram that illustrates an example of the frame displayed on the display unit during a game.

Next, an explanation is given of an operation of the judgment assistance system 100 that is configured as described above. FIG. 4 is a flowchart that illustrates an example of the operation of the judgment assistance system 100 according to the present disclosure. As illustrated in FIG. 4, the frame-display control unit 51 acquires frames captured by the cameras 10 and displays them on the display unit 30 (Step S10). FIG. 5 is a diagram that illustrates an example of the frame displayed on the display unit 30 during a game. At Step S10, as illustrated in FIG. 5, the frame-display control unit 51 causes the first display section 30*a* to display the frames 71 to 74 that are captured by the cameras 11 to 14 and causes the second display section 30*b* to display the frames 75 to 78 that are captured by the cameras 15 to 18.

Next, the movement-information extracting unit 52 detects the ball BL1 within the frames 70 displayed on the display unit 30 and extracts the movement information (Step S20). At Step S20, for example during image processing, or the like, on the frames 70 displayed on the display unit 30, the movement-information extracting unit 52 detects a ball-like object included in the frame 70, thereby detecting the ball BL1. In the example illustrated in FIG. 5, for example, the movement-information extracting unit 52 detects the ball BL1 from the three frames 74, 76, and 77 out of the frames 71 to 78.

After the ball BL1 is detected, the movement-information extracting unit 52 extracts the movement information on the ball BL1 with regard to each of the frames 74, 76, and 77, from which the ball BL1 is detected. For example, the movement-information extracting unit 52 extracts a velocity vector as the movement information on the ball BL1. For the velocity vector, the moving velocity is defined depending on the magnitude of the vector, and the moving direction is defined depending on the direction of the vector.

Figures 6, 7:
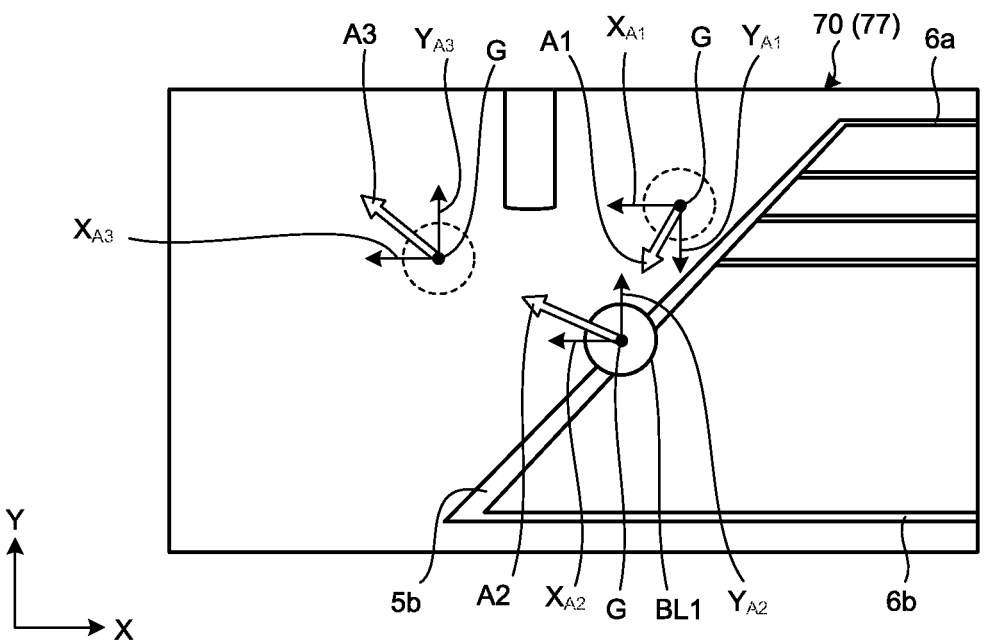
FIG. 6 is a diagram that illustrates the velocity vector that is the movement information.
FIG. 7 is the data table that illustrates an example of the movement information stored in a movement-information storage unit.

FIG. 6 is a diagram that illustrates the velocity vector that is the movement information. FIG. 6 illustrates the frame 77 as an example among the three frames 74, 76, and 77, from which the ball BL1 is identified; however, the same explanation is applicable to the other frames 74 and 76. For example, the movement-information extracting unit 52 detects the center of gravity G of the ball BL1 and extracts the velocity vector with regard to the center of gravity G of the ball BL1 at each predetermined period. Furthermore, the predetermined period may be, for example, the same period as the frame period of the cameras 11 to 18 or may be a period that corresponds to multiple frames. In this case, the movement-information extracting unit 52 extracts a velocity vector in a state where it is dissolved into the component (hereafter, referred to as the "X component") in the X direction and the component (hereafter, referred to as the "Y component") in the Y direction.

FIG. 6 mainly illustrates three velocity vectors A1, A2, and A3, extracted by the movement-information extracting unit 52. The movement-information extracting unit 52 extracts an X component $X_{A1}$ and a Y component $Y_{A1}$ as the velocity vector A1. The movement-information extracting unit 52 extracts an X component $X_{A2}$ and a Y component $Y_{A2}$ as the velocity vector A2. The movement-information extracting unit 52 extracts an X component $X_{A3}$ and a Y component $Y_{A3}$ as the velocity vector A3. Here, FIG. 6 illustrates the frame 77 with the illustrations of the velocity vectors A1, A2, and A3 in a superimposed manner; however, in practice, the frame 77 displayed on the display unit 30 does not need to present the velocity vectors A1, A2, and A3.

The movement-information extracting unit 52 stores the extracted velocity vectors A1, A2, and A3 as the movement information in the movement-information storage unit 62. FIG. 7 is the data table that illustrates an example of the movement information stored in the movement-information storage unit 62. As illustrated in FIG. 7, movement information DT1 includes identification information 62a, time information 62b, X-direction information 62c, and Y-direction information 62d. The identification information 62a is the information for identifying a velocity vector. The time information 62b indicates the capturing time at which a velocity vector is extracted. Here, the pieces of movement information illustrated in FIG. 7 are arranged in ascending order of the capturing time. The X-direction information 62c indicates the moving velocity (the X component) and the moving direction (positive/negative) of the ball BL1 with respect to the X direction. The Y-direction information 62d indicates the moving velocity (the Y component) and the moving direction (positive/negative) of the ball BL1 with respect to the Y direction. For example, FIG. 7 illustrates the identification information 62a, the time information 62b, the X-direction information 62c, and the Y-direction information 62d with respect to the velocity vectors A1, A2, and A3 illustrated in FIG. 6.

Next, the upon-reversal information extracting unit 53 detects whether the moving direction of the ball BL1 is reversed in the Y direction within the frame 70 and extracts at least the X-direction component of the moving velocity of the ball BL1 at the time when the value of the Y component of the ball BL1 in the moving direction is reversed (upon reversal) (Step S30).

At Step S30, the upon-reversal information extracting unit 53 first retrieves the pieces of movement information, extracted by the movement-information extracting unit 52, in ascending order of the capturing time and detects the velocity vector, of which the value of the Y component in the moving direction is first changed from negative to positive, as a reverse velocity vector. If a reverse velocity vector is detected, for example, the upon-reversal information extracting unit 53 stores it as reverse information 62e (see FIG. 7) in the movement-information storage unit 62 of the storage unit 60. For example, FIG. 7 illustrates a case where the velocity vector A2 is a reverse velocity vector. Next, the upon-reversal information extracting unit 53 extracts the time information 62b and the X-direction information 62c with regard to the reverse velocity vector. Thus, the upon-reversal information extracting unit 53 may extract the time information at the time of reversal and the value of the X component of the moving velocity at the time of reversal in a related manner.

Next, the frame selecting unit 54 selects the one or more frames 70 from the frames 70 displayed on the display unit 30 in accordance with the value of the X component of the moving velocity of the ball BL1 upon reversal (Step S40).

At Step S40, the frame selecting unit 54 first determines whether the judgment target line is either the side line 5 or the end line 6. According to the present disclosure, when this determination is made, the control unit 50 allows an operator to select the judgment target line. For example, the control unit 50 may cause the display unit 30 to display the instruction for touching (inputting) the side-line selection button 39a or the end-line selection button 39b displayed on the display unit 30. Such an instruction includes, for example, flashing the side-line selection button 39a and the end-line selection button 39b displayed on the display unit 30. The control unit 50 determines the selected judgment target line on the basis of the output signal from the input unit 20. Then, among the frames 70 in which the selected judgment target line is captured, the frame selecting unit 54 compares the frames 70 upon the most recent reversal, in which the Y component of the ball BL1 is reversed, retroactively from when the judgment target line is selected, and selects the frame 70 of which the X component of the moving velocity of the ball BL1 has the largest value.

In the present disclosure, an explanation is given of a case where, for example, the point of fall of the ball BL is in the neighborhood of the side line 5 and an operator, such as a judge, selects the side line 5 as the judgment target line. In this case, the frame selecting unit 54 detects the frames 71, 73, 74, 76, 77, and 78 as the frames 70 in which the side line 5 is captured. The frame selecting unit 54 extracts reverse velocity vectors that are acquired from the above-described three frames 74, 76, and 77, from which the ball BL1 is identified, among the detected frames 71, 73, 74, 76, 77, and 78.

FIG. 8 is the data table that indicates the movement information on each extracted reverse velocity vector. The frame selecting unit 54 may generate the data table, illustrated in FIG. 8, in the storage unit 60 with regard to movement information DT2 on the reverse velocity vector of each of the extracted frames 70. The movement information DT2 includes frame information 62f and rank information 62g in addition to the identification information 62a, the time information 62b, the X-direction information 62c, and the Y-direction information 62d, which are described above. The frame information 62f is information that indicates from which of the frames 70 each of the reverse velocity vectors A2, B2, and C2 is extracted. The rank information 62g is data that indicates a rank with regard to the magnitude of the X component of the moving velocity among the extracted reverse velocity vectors. With regard to the identification information 62a, FIG. 8 illustrates that, among the three frames 74, 76, and 77, A2 is the reverse velocity vector extracted from the frame 77, B2 is the reverse velocity vector extracted from the frame 74, and C2 is the reverse velocity vector extracted from the frame 76.

With regard to the three extracted reverse velocity vectors A2, B2, and C2, the frame selecting unit 54 retrieves the X-direction information 62c and ranks them in descending order of the X component of the moving velocity upon reversal. The frame selecting unit 54 causes the data table of the storage unit 60 to store a ranking result as the rank information 62g. Then, the frame selecting unit 54 detects the reverse velocity vector of which the X component of the moving velocity has the largest value. According to the present disclosure, the frame selecting unit 54 retrieves the rank information 62g and detects the reverse velocity vector A2 whose rank is 1. The frame selecting unit 54 retrieves the frame information 62f on the detected reverse velocity vector A2 and extracts the frame 77 on the basis of the frame information 62f. Then, the frame selecting unit 54 selects the extracted frame 77.

Furthermore, in addition to the reverse velocity vector, of which the X component of the moving velocity has the largest value, the frame selecting unit 54 may also detect the reverse velocity vector of which the X component of the moving velocity has the second largest value. In this case, the frame selecting unit 54 retrieves the rank information 62g and detects the reverse velocity vector B2, whose rank is 2. The frame selecting unit 54 retrieves the frame information 62f on the detected reverse velocity vector B2 and extracts the frame 74 on the basis of the frame information 62f. Then, the frame selecting unit 54 selects the extracted frame 74.

Figure 9:
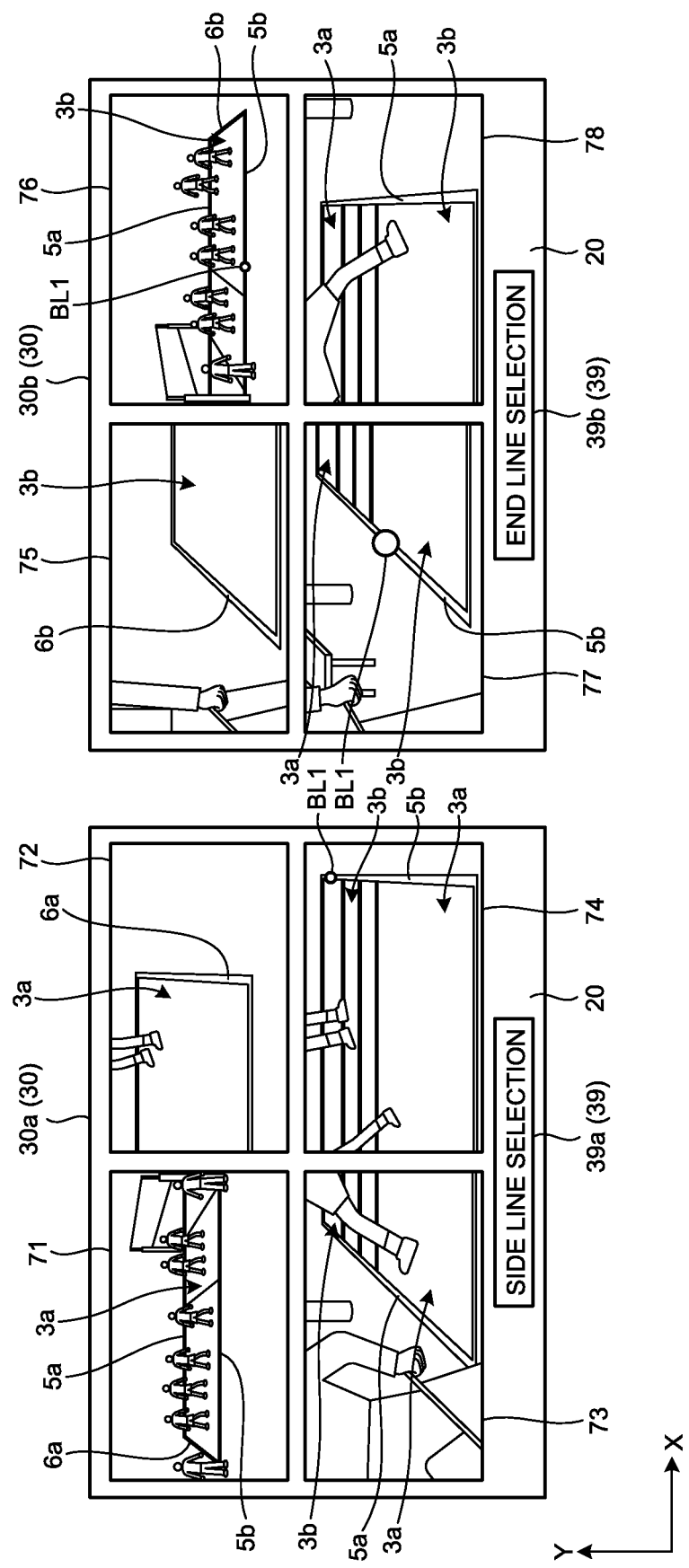
FIG. 9 is a diagram that illustrates an example of the highlighted display.

Next, the highlighted-display control unit 55 highlights the frame 70 that is selected by the frame selecting unit 54 (Step S50). At Step S50, the highlighted-display control unit 55 selects and presents the display data stored in the highlighted-display information storage unit 63 or executes the display program, or the like, thereby making highlighted display. FIG. 9 is a diagram that illustrates an example of the highlighted display. As illustrated in FIG. 9, the frame selecting unit 54 makes highlighted displays 81 and 82 to make outer rims noticeable on, for example, the frame 74, from which the reverse velocity vector with the largest value of the X component of the moving velocity is extracted, and the frame 77, from which the reverse velocity vector with the second largest value of the X component of the moving velocity is extracted. Here, the example of the highlighted display is not limited to the display with a noticeable outer rim. For example, the highlighted-display control unit 55 may enlarge the selected frames 74 and 77 or may display icons, or the like, which indicate the selected frames 74 and 77. Furthermore, the highlighted-display control unit 55 may flash the highlighted displays 81 and 82.

As described above, the judgment-assistance processing device 40 according to the present disclosure includes the frame-display control unit 51 that causes the frames 70 of the lines 4 on the court 3 for the ball sport, captured by the cameras 10 at different angles, to be displayed side by side on the display unit 30; the movement-information extracting unit 52 that detects the ball BL1 within the frames 70 displayed on the display unit 30 and that extracts the movement information DT1 that indicates the moving velocity and the moving direction of the ball BL1 within the frame 70; the upon-reversal information extracting unit 53 that detects whether the moving direction of the ball BL1 is reversed in the Y direction within the frame 70 and that extracts at least the magnitude of the X component of the moving velocity of the ball BL1 upon reversal; the frame selecting unit 54 that selects the one or more frames 70 from the frames 70 displayed on the display unit 30 on the basis of the magnitude of the X component of the moving velocity of the ball BL1 upon reversal; and the highlighted-display control unit 55 that highlights the one or more frames 70 that are selected from the frames 70 displayed on the display unit 30.

The judgment-assistance processing device 40 automatically selects and highlights the frame 70 that is effective for an in-out judgment from the frames 70 displayed on the display unit 30, whereby there may be a reduction in the time for a judge, or the like, to select the frame 70, which is targeted for the in-out judgment, from the frames 70. Thus, the judgment-assistance processing device 40 may reduce the time required for in-out judgments.

Furthermore, the judgment-assistance processing device 40 further includes the storage unit 60 that stores the frames 70 and the movement information DT1; therefore, without using external storage units, or the like, processing may be performed in conjunction with the control unit 50 in a stable manner at a high speed.

Furthermore, the cameras 10 include the cameras 11, 13, 14, 16, 17, and 18, which capture the side line 5 out of the lines 4, and the cameras 11, 12, 15, and 16, which capture the end line 6, and in the judgment-assistance processing device 40, if one judgment target line is selected from the side line 5 and the end line 6, the frame selecting unit 54 selects the frame 70, of which the X component of the moving velocity of the ball BL1 upon reversal has the largest value, from the frames 70 in which the judgment target line is captured. Thus, if the ball BL is captured by the cameras 10 on both sides, i.e., the cameras 10 that capture the side line 5 and the cameras 10 that capture the end line 6, it is possible to narrow down the target frames 70, for which the X component of the ball BL1 in the moving direction within the frame 70 is determined. Thus, the judgment-assistance processing device 40 may conduct the judgment assistance process more quickly.

Second Embodiment

Figure 10:
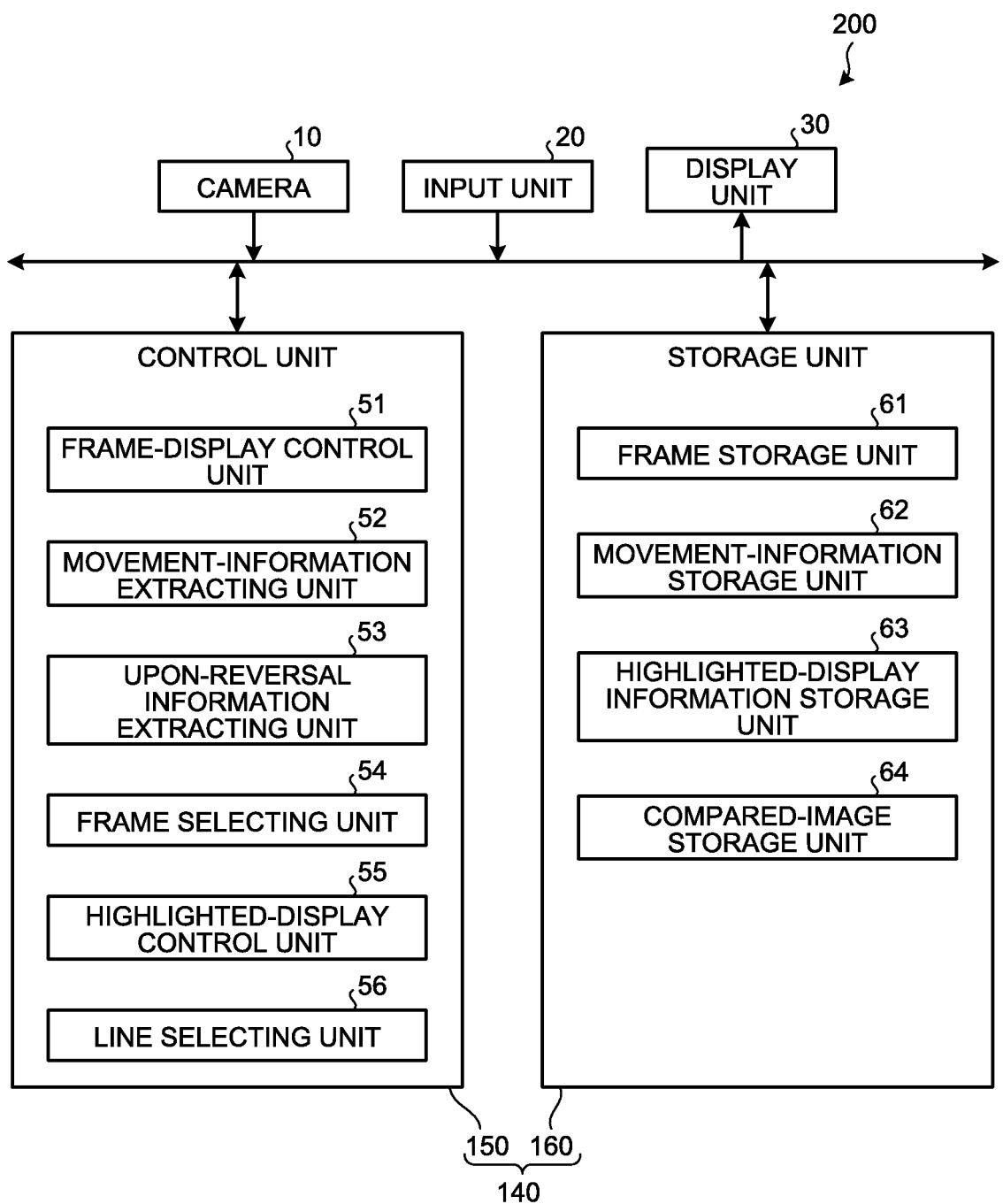
FIG. 10 is a diagram that illustrates an example of a judgment assistance system according to a second embodiment.

Next, a second embodiment is explained. FIG. 10 is a block diagram that illustrates an example of a judgment assistance system 200 according to the second embodiment. In the second embodiment, the same components as those in the judgment assistance system 100 according to the first embodiment are attached with the same reference numerals, and explanations are omitted or simplified. As illustrated in FIG. 10, the judgment assistance system 200 includes the camera 10, the input unit 20, the display unit 30, and a judgment-assistance processing device 140.

The judgment-assistance processing device 140 includes a control unit 150 and a storage unit 160. The control unit 150 includes a line selecting unit 56 in addition to the frame-display control unit 51, the movement-information extracting unit 52, the upon-reversal information extracting unit 53, the frame selecting unit 54, and the highlighted-display control unit 55. The line selecting unit 56 automatically selects a judgment target line before the process during which the frame selecting unit 54 determines the judgment target line.

The storage unit 160 includes a compared-image storage unit 64 in addition to the frame storage unit 61, the movement-information storage unit 62, and the highlighted-display information storage unit 63. The compared-image storage unit 64 stores a compared image that is compared with the image of the ball BL1 within the frame 70 when the line selecting unit 56 selects a judgment target line.

Figure 13:
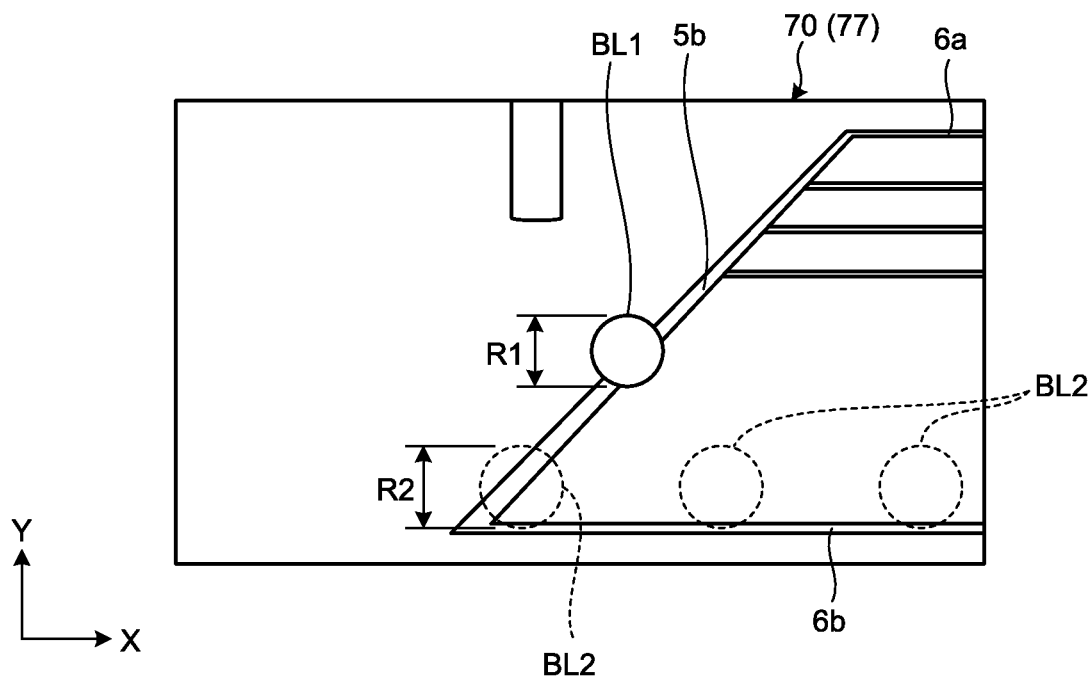
FIG. 13 is a diagram that illustrates an example of a compared image according to the present disclosure.

FIG. 13 is a diagram that illustrates an example of a compared image BL2. The compared image BL2 is an image of the ball BL in a state that it is located on the side line 5 by being previously captured by the camera 10, which captures the end line 6. Furthermore, the compared image BL2 is an image of the ball BL in a state that it is located on the end line 6 by being previously captured by the camera 10, which captures the side line 5. Furthermore, the compared image BL2 is captured in a state such that the capturing condition, such as the position, the angle, or the angle of view of each of the cameras 10, is set to be the same as the capturing condition in a case where the line 4 is captured during the above-described game. FIG. 13 illustrates, for example, the compared image BL2 in which the ball BL that is located on the end line 6b is captured by the camera 17 that captures the side line 5b. As illustrated in FIG. 13, the compared image BL2 is captured in a state where the ball BL of the same dimension is located at multiple positions on the end line 6b. Each of the compared images BL2 is stored in relation to the information on a diameter R2 within the frame 77 in the compared-image storage unit 64.

Figure 11:
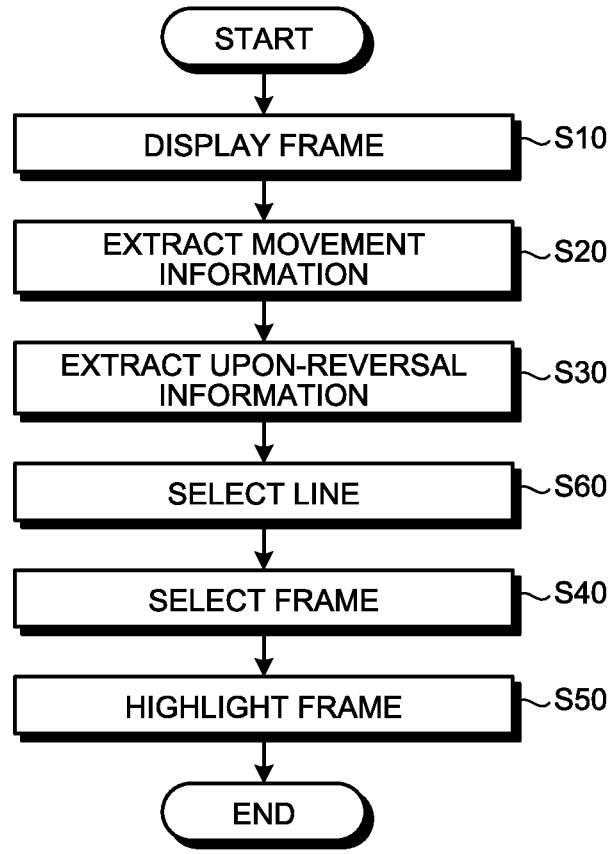
FIG. 11 is a flowchart that illustrates an example of the operation of the judgment assistance system according to the present embodiment.

Next, an explanation is given of an operation of the judgment assistance system 200 that is configured as described above. FIG. 11 is a flowchart that illustrates an example of the operation of the judgment assistance system 200 according to the present disclosure. As illustrated in FIG. 11, the judgment-assistance processing device 140 causes the process from Step S10 to Step S30 to be performed in the same procedure as that in the first embodiment.

Figure 12:
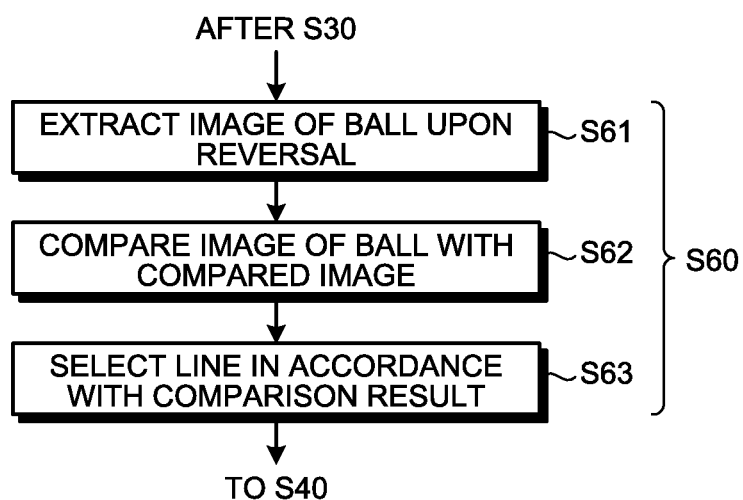
FIG. 12 is a flowchart that illustrates the operation performed by a line selecting unit in detail.

At Step S30, if the upon-reversal information extracting unit 53 detects that the Y component of the ball BL1 is reversed, the line selecting unit 56 selects a judgment target line on the basis of the frame of the ball BL and the previously set compared image after Step S30 (Step S60). FIG. 12 is a flowchart that illustrates the operation performed by the line selecting unit 56 at Step S60 in detail. At Step S60, as illustrated in FIG. 12, the line selecting unit 56 extracts the image of the ball BL1 upon reversal within each of the frames 70 (Step S61). At Step S61, the line selecting unit 56 extracts the image (see FIG. 13) of the ball BL1 upon reversal from the above-described three frames 74, 76, and 77, from which the ball BL1 is identified, due to for example image processing.

Next, the line selecting unit 56 compares the extracted image of the ball BL1 with the compared image BL2 (Step S62). At Step S62, the line selecting unit 56 compares a diameter R1 of the image of the ball BL1 with the diameter R2 of the compared image BL2.

Next, the line selecting unit 56 selects the line that is targeted for a judgment in accordance with a comparison result (Step S63). At Step S63, if the diameter R1 of the image of the ball BL1 is smaller than the diameter R2 of the compared image BL2, the line selecting unit 56 determines that the judgment target line is the side line 5 on the frame 70 of the camera 10 that captures the side line 5. Furthermore, it is determined that the judgment target line is the end line 6 on the frame 70 of the camera 10 that captures the end line 6. Moreover, if the diameter R1 of the image of the ball BL1 is equal to or more than the diameter R2 of the compared image BL2, the line selecting unit 56 determines that the judgment target line is the end line 6 on the frame 70 of the camera 10 that captures the side line 5. Furthermore, it is determined that the judgment target line is the side line 5 on the frame 70 of the camera 10 that captures the end line 6. Step S60 is finished as above, and a transition is made to Step S40.

At Step S40, the frame selecting unit 54 determines whether the judgment target line is either the side line 5 or the end line 6 in accordance with a selection result of the line selecting unit 56. Specifically, if the line selecting unit 56 determines that the judgment target line is the side line 5, the frame selecting unit 54 determines that the judgment target line is the side line 5. Furthermore, if the line selecting unit 56 determines that the judgment target line is the end line 6, the frame selecting unit 54 determines that the judgment target line is the end line 6. Then, in the same manner as the first embodiment, the frame selecting unit 54 detects the frames 70 in which the selected judgment target line is captured and selects the frame 70, of which the X component of the moving velocity of the ball BL1 upon reversal has the largest value, from the frames 70 in which the selected judgment target line is captured. Then, the highlighted-display control unit 55 performs Step S50 in the same manner as the first embodiment.

As described above, the judgment-assistance processing device 140 according to the present disclosure further includes the line selecting unit 56 that selects a judgment target line on the basis of the image of the ball BL1 and the previously set compared image BL2. Thus, it is possible to avoid the trouble of operators, such as judges, having to select a judgment target line, whereby in-out judgments may be conducted in a shorter time.

The technical scope of the present disclosure is not limited to the above-described embodiments, and changes may be made as appropriate without departing from the scope of the present disclosure. For example, in the above-described judgment-assistance processing devices 40 and 140, after the highlighted displays 81 and 82 are made, the frame-display control unit 51 may cause the display unit 30 to reproduce part of the frames 70 captured in a predetermined time period around a time t2 of reversal. Thus, the display unit 30 may display extracted scenes that are effective for judgments of the judge, or the like, whereby it is possible to reduce the time required for in-out judgments.

What is claimed is:

1. A judgment assistance system comprising:
   multiple cameras that capture lines on a court for a ball sport at different angles;
   a display unit that displays frames side by side on the display unit that are captured by the cameras; and
   a judgment-assistance processing device comprising:
   a frame display controller, using a processor, that causes frames of lines on a court for a ball sport to be displayed side by side on a display unit, the frames being captured by multiple cameras at different angles;
   a movement-information extractor, using a processor, that detects a ball from the frames displayed side by side on the display unit and extracts movement information that indicates a moving velocity and a moving direction of the ball within the frame;
   an upon-reversal information extractor, using a processor, that detects whether the moving direction of the ball is reversed in a first direction within the frame and extracts at least a magnitude of a component of the moving velocity of the ball upon reversal in a second direction, the second direction being perpendicular to the first direction;
   a frame selector, using a processor, that selects the one or more frames from the frames displayed side by side on the display unit in accordance with the magnitude of the component of the moving velocity of the ball upon the reversal in the second direction; and
   a highlighted-display controller, using a processor, that highlights the one or more frames that are selected from the frames displayed side by side on the display unit, performing a judgment assistance process when a judgment is made as to whether a point of fall of a ball is inside or outside of the court based on the frames displayed side by side on the display unit.

2. The judgment-assistance processing device according to claim 1, further comprising a storage unit that may store the frame and the movement information.

3. The judgment-assistance processing device according to claim 1, wherein:
   the upon-reversal information extractor extracts the magnitude of the component of the moving velocity of the ball upon the reversal in the second direction in relation to a time of the reversal, and
   the frame display controller causes the display unit to display part of the frames captured in a predetermined time period around the time of the reversal.

4. The judgment-assistance processing device according to claim 1, wherein:
the cameras include the cameras that capture a side line out of the lines and the cameras that capture an end line that is perpendicular to the side line, and
if one judgment target line is selected from the side line and the end line, the frame selector selects the frame of which the component of the moving velocity of the ball upon the reversal in the second direction has a largest value, the frame being selected from the frames in which the judgment target line is captured.

5. The judgment-assistance processing device according to claim 4, further comprising a line selector that selects the judgment target line based on an image of the ball upon the reversal and a compared image that is previously set.

6. A judgment assistance method comprising:
capturing lines on a court for a ball sport at different angles using multiple cameras;
displaying frames side by side on a display unit that are captured by the cameras;
causing frames of lines on a court for a ball sport to be displayed side by side on a display unit, the frames being captured by multiple cameras at different angles;
detecting a ball from the frames displayed side by side on the display unit and extracting movement information that indicates a moving velocity and a moving direction of the ball within the frame;
detecting whether the moving direction of the ball is reversed in a first direction within the frame and extracting at least a magnitude of a component of the moving velocity of the ball upon reversal in a second direction, the second direction being perpendicular to the first direction;
selecting the one or more frames from the frames displayed side by side on the display unit in accordance with the magnitude of the component of the moving velocity of the ball upon the reversal in the second direction;
highlighting the one or more frames that are selected from the frames displayed side by side on the display unit; and
performing a judgment assistance process when a judgment is made as to whether a point of fall of a ball is inside or outside of the court based on the frames displayed side by side on the display unit.

7. A non-transitory computer readable recording medium recording therein a judgment assistance program causing a computer to execute:
capturing lines on a court for a ball sport at different angles;
displaying frames side by side on a display unit that are captured;
a process to cause frame of lines on a court for a ball sport to be displayed side by side on a display unit, the frames being captured by multiple cameras at different angles;
a process to detect a ball from the frames displayed on the display unit and extract movement information that indicates a moving velocity and a moving direction of the ball within the frame;
a process to detect whether the moving direction of the ball is reversed in a first direction within the frame and extract at least a magnitude of a component of the moving velocity of the ball upon reversal in a second direction, the second direction being perpendicular to the first direction;
a process to select the one or more frames from the frames displayed on the display unit in accordance with the magnitude of the component of the moving velocity of the ball upon the reversal in the second direction; and
a process to highlight the one or more frames that are selected from the frames displayed on the display unit; and
performing a judgment assistance process when a judgment is made as to whether a point of fall of a ball is inside or outside of the court based on the frames displayed side by side on the display unit.

* * * * *